United States Patent [19]

Yoshioka et al.

[11] Patent Number: 5,049,617
[45] Date of Patent: Sep. 17, 1991

[54] ORGANOPOLYSILOXANE COMPOUND

[75] Inventors: Hiroshi Yoshioka, Tokyo; Ichiro Ono; Hitoshi Uehara, both of Gunma, all of Japan

[73] Assignee: Shin-Etsu Chemical Co., Ltd., Tokyo, Japan

[21] Appl. No.: 412,729

[22] Filed: Sep. 26, 1989

[30] Foreign Application Priority Data

Sep. 27, 1988 [JP] Japan .................. 63-239774

[51] Int. Cl.$^5$ .............................................. C08F 8/00
[52] U.S. Cl. .................. 525/104; 525/106; 526/279; 556/440; 528/34; 528/18; 528/41; 528/32; 528/31
[58] Field of Search .......... 528/34, 18, 41, 32, 528/31; 556/440; 526/279; 525/106, 104

[56] References Cited

U.S. PATENT DOCUMENTS

| | | | |
|---|---|---|---|
| 4,525,563 | 6/1985 | Shibata | 526/279 |
| 4,731,411 | 3/1988 | Lucas | 528/34 |
| 4,845,259 | 7/1989 | Arai et al. | 556/440 |
| 4,873,298 | 10/1989 | Ryntz | 528/34 |

OTHER PUBLICATIONS

Derwent Abstract, Japan, J6 3188-689-A, 04/08/88.

*Primary Examiner*—Melvyn I. Marquis
*Assistant Examiner*—M. Glass
*Attorney, Agent, or Firm*—Millen, White & Zelano

[57] ABSTRACT

Organopolysiloxane compounds represented by the following general formula (I), which can fully achieve their effects as functional group when introduced as cross-linking groups into moisture cross-linkable polymers:

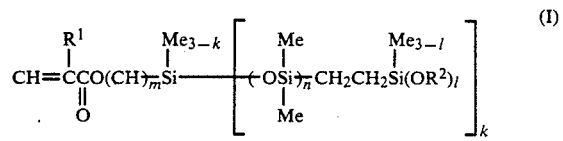

(wherein $R^1$ represents methyl group or hydrogen atom; $R^2$ represents methyl group or ethyl group; m represents an integer from 1 to 3; n represents an integer from 3 to 50; k represents 1 or 2 and l represents 2 or 3).

13 Claims, 5 Drawing Sheets

ORGANOPOLYSILOXANE COMPOUND

FIELD OF THE INVENTION

This invention relates to a novel organopolysiloxane compound and, more particularly, to a novel organopolysiloxane compound which contains one or more alkoxysilyl functional groups and exhibits excellent characteristics when introduced as a cross-linking group into a moisture cross-linkable polymer.

BACKGROUND OF THE INVENTION

In the arts of moisture cross-linkable polymers containing alkoxysilyl functional group(s), vinylalkoxysilanes or (meth)acryl-substituted alkoxysilanes have been employed as the introduced cross-linking groups.

However, not only the cross-linking speeds of these cross-linking groups are low, but also the moisture permeabilities of the alkoxysilane-introduced polymers which are cross-linked by those cross-linking groups are poor, and therefore it is difficult for moisture to reach the depth of the polymer assembly which results in insufficient cross-linkage at the depth. In addition, since the structure of the cross-linked part is rigid, pliability of the polymer is lost and the cross-linked polymer is apt to have cracks.

As a result of trying to make a basic skeleton of a dimethyl-polysiloxane chain with a great moisture permeability for the purpose of obviating the above-described defects, it has now been found that the depth cross-linkability is greatly improved because the moisture permeability of the resulting polymer is enhanced due to that chain structure.

SUMMARY OF THE INVENTION

Therefore, a first object of this invention is to provide an organo-polysiloxane which has a basic skeleton with a great moisture permeability, and exhibits excellent characteristics when introduced as a cross-linking group into a moisture cross-linkable polymer.

A second object of this invention is to provide an organo-polysiloxane which can enhance both cross-linking speed and cross-linking efficiency of a moisture cross-linkable polymer when introduced as the cross-linking group of said polymer.

A third object of this invention is to provide an organo-polysiloxane which, when introduced as cross-linking group into a moisture cross-linkable polymer, can make a great improvement in the cracking resistance of the cross-linked polymer.

A fourth object of this invention is to provide an organopolysiloxane which has dimethylpolysiloxane chain(s) as the basic skeleton, and is of use when introduced as the cross-linking group(s) to a moisture cross-linkable polymer because it can ensure an excellent depth cross-linkability to said polymer.

The above-described objects are attained with an organo-polysiloxane represented by the following general formula (I):

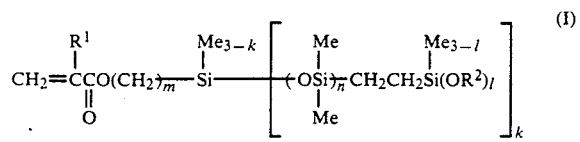

(wherein $R^1$ represents a methyl group or hydrogen atom; $R^2$ represents a methyl group or ethyl group; m represents an integer from 1 to 3; n represents an integer from 3 to 50; k represents 1 or 2 and l represents 2 or 3).

The organopolysiloxanes of this invention are extremely effective in synthesizing moisture cross-linkable polymers containing alkoxysilyl functional groups which are excellent in depth cross-linkability and cross-linking speed, and gain high crack resistance after cross-linking.

DETAILED DESCRIPTION OF THE INVENTION

Figure 1:
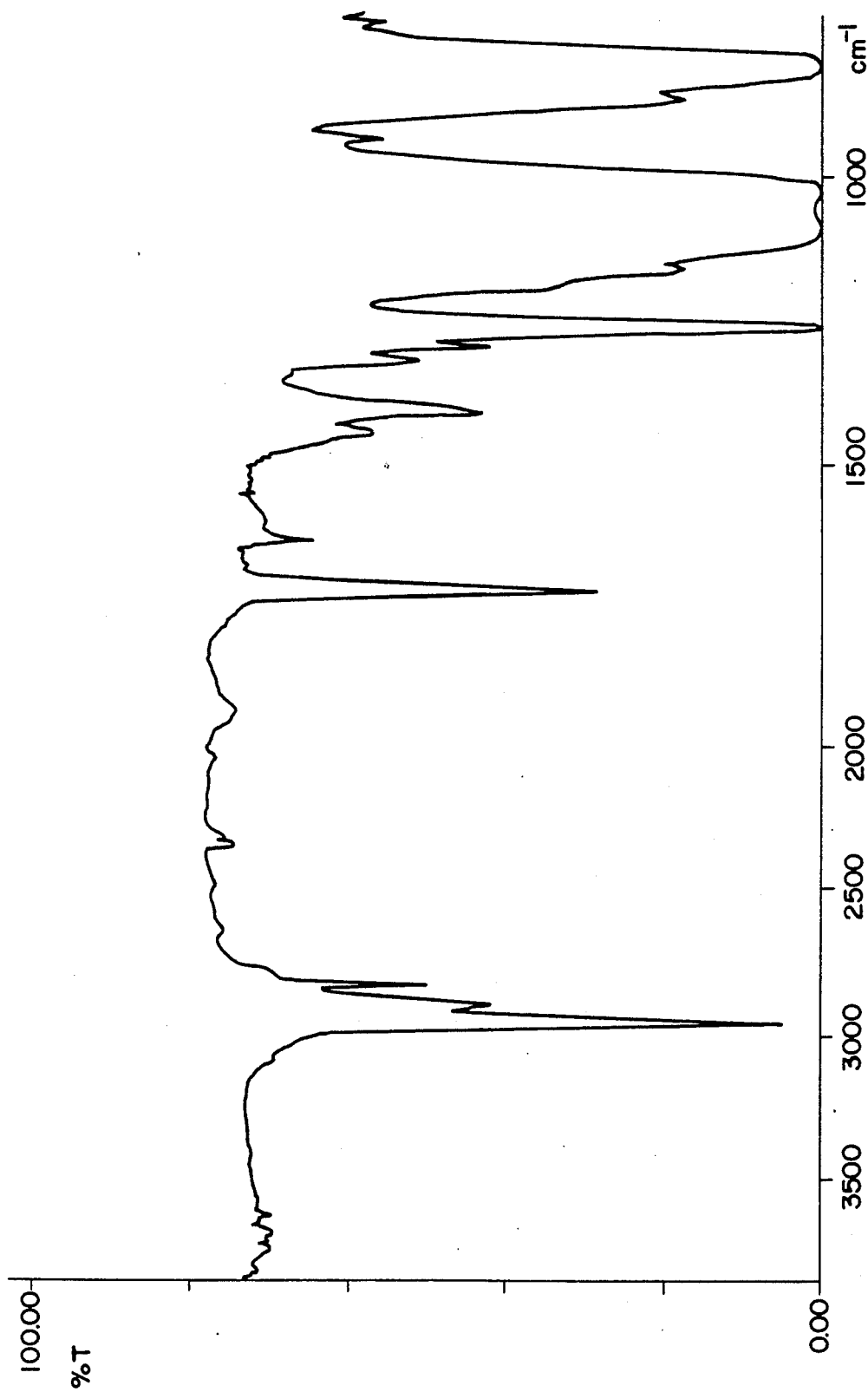
FIGS. 1 to 5 are infrared absorption spectra of the organo-polysiloxanes synthesized in Examples 1 to 5, respectively, according to this invention.
Figure 2:
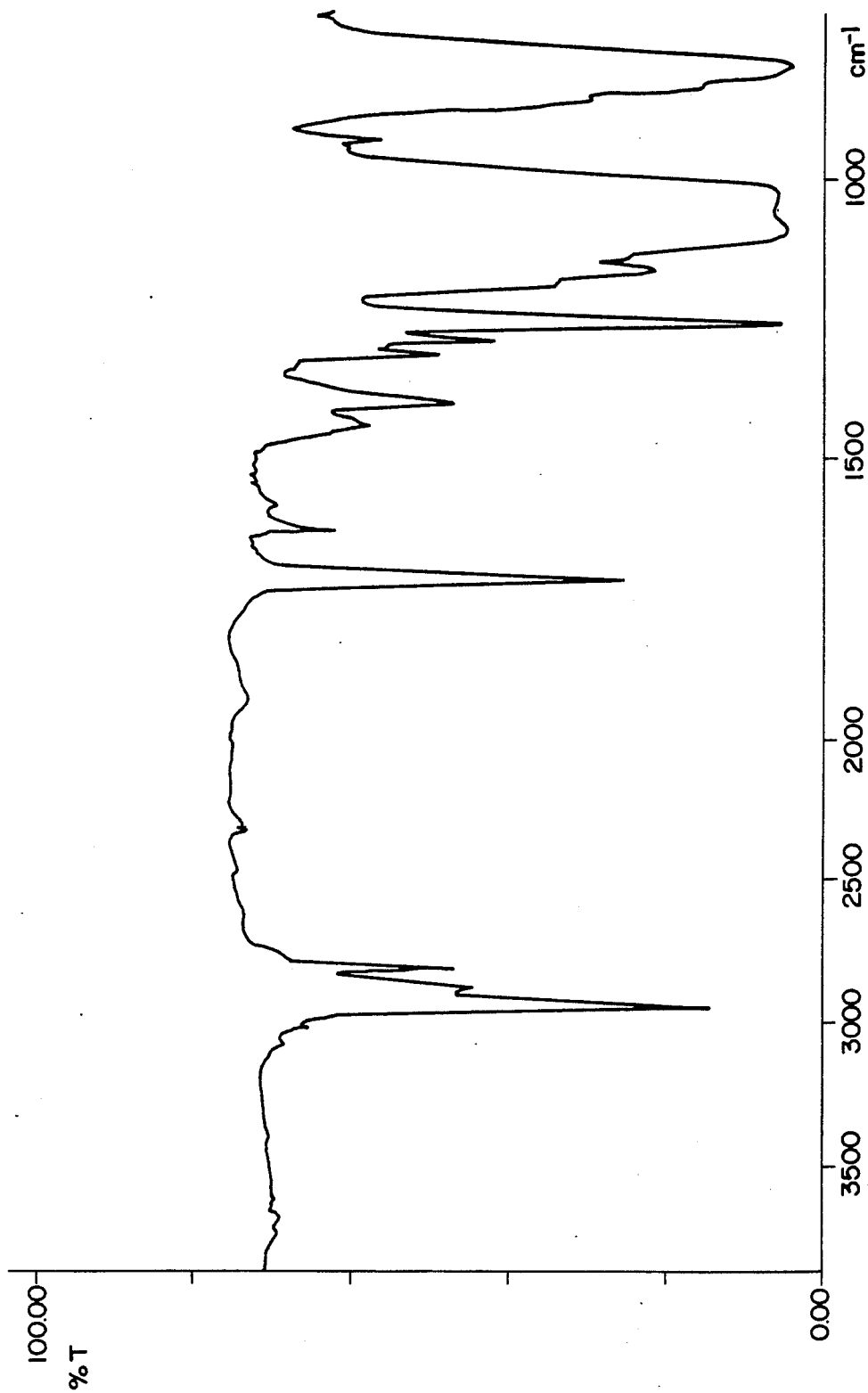

The organo-polysiloxane of this invention can be synthesized in accordance with two or more processes. Two representatives of those processes are described below in detail.

Process I

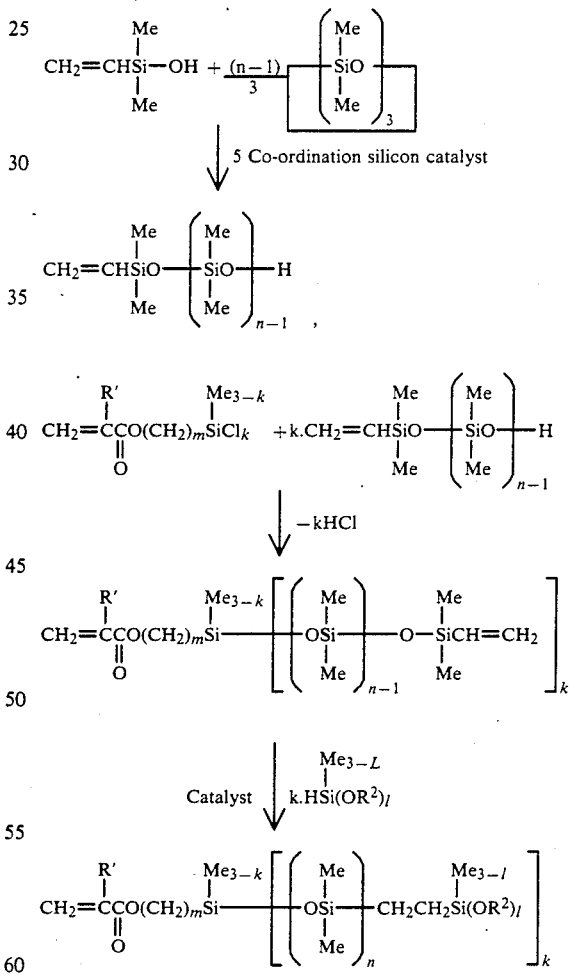

At the first stage of the above-described process I, the ring-opening polymerization of hexamethylcyclotrisiloxane in the presence of dimethyl-vinylsilanol and a 5 coordination silicon catalyst can be readily effected by running the reaction in a polar solvent for 0.1 to 10 hours at a temperature ranging from 50° C. to 120° C. By this ring-opening polymerization, an organopolysiloxane (one end group of which is blocked by a vinyl group and the other of which is blocked by a silanol group) is obtained in a monodispersed condition. The detail of this reaction is disclosed in Japanese Patent Application JP-Koukoku-45-1070.

Examples of catalysts which can be used in the above-described reaction include

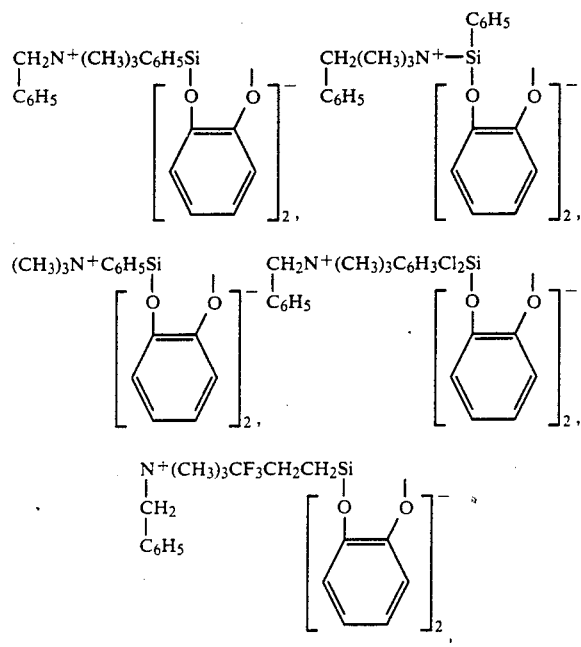

Examples of polar solvents which can be used include acetonitrile, deimethyl sulfoxide, dimethyl sulfone, tetramethylene sulfone, and so on.

The dehydrochlorination reaction between the thus obtained organopolysiloxane, one end group of which is blocked by vinyl group and the other of which is blocked by a silanol group, and a (meth)acryl-substituted chlorosilane compound is carried out at a temperature ranging from 0° C. to 120° C. in presence of a hydrogen chloride capture.

In the foregoing reaction, SiCl and SiOH should be controlled so as to be present in equimolar amounts. It must be avoided in particular to carry out the reaction under the condition that SiCl is present in excess of SiOH, because the reaction under such a condition brings about the contamination of the final product with polyfunctional (including bifunctional) siloxanes containing (meth) acryl groups as functional groups, which causes gelation in the copolymerization with vinyl monomers which copolymerization is the major application of the organopolysiloxane of this invention.

Examples of a hydrogen chloride capture to be used in the above-described reaction are tertiary amines such as trimethylamine, triethylamine, pyridine, N,N-dimethylaniline and the like.

Although a solvent is not essential for the above-described reaction, inert solvents can be used, if desired. Examples of such inert solvents include aromatic hydrocarbons such as benzene, toluene, xylene, etc., aliphatic hydrocarbons such as n-hexane, cyclohexane, etc., and ethers such as diethyl ether, dibutyl ether, etc.

The organopolysiloxane obtained by the dehydrochlorination reaction, one end group of which is blocked by a (meth)acryl group and the other of which is blocked by a vinyl group, undergoes the hydrosilylation reaction with an alkoxyhydrogen-silane to finally produce the (meth)acryl functional siloxane having alkoxy groups at terminals of the molecule, which is the described compound of this invention.

The above described hydrosilylation reaction is carried out at a temperature ranging from 50° C. to 150° C. in the presence of a hydrosilylation catalyst without using any solvent, or using an inert solvent.

Examples of the hydrosilylation catalyst are platinum or rhodium type transition metal compounds.

Examples of the inert solvent are the same ones as used in the above-described dehydro-chlorination reaction.

In this reaction, an alkoxy-hydrogensiloxane is used in an amount equimolar with, preferably in excess of, the polysiloxane, which has (meth)acrylate group as one end group and a vinyl group as the other end group, on a vinyl group basis. The reaction with excess alkoxy-hydrogensiloxane has an advantage in that the heightened reaction rate can ensure the blocking of the terminal with alkoxysilyl groups. Unreacted surplus alkoxyhydrogensiloxane can be easily removed by stripping because of its low boiling point.

Process II

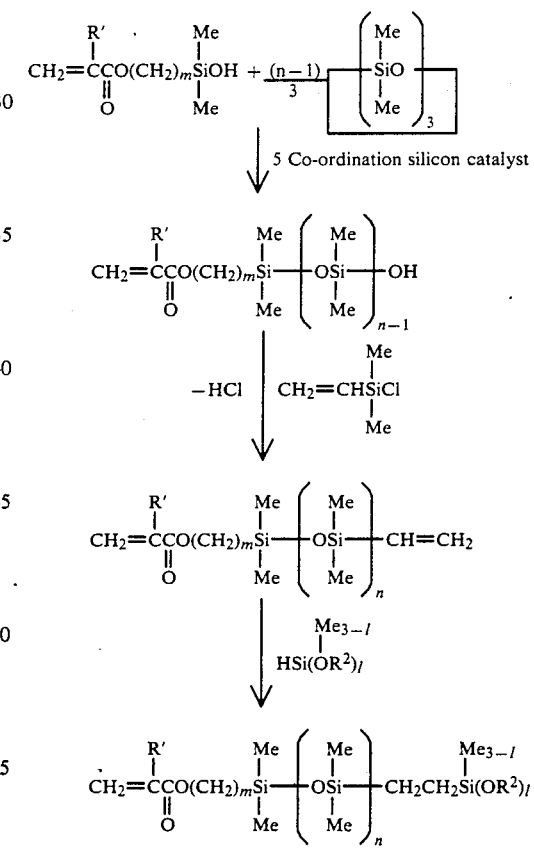

The reaction of (meth)acrylate-substituted dimethylsilanol with hexamethyl-cycrotrisiloxane at the first stage of the above-described process II can be effected by using the same catalyst under the same condition as the reaction at the first stage of the process I illustrated hereinbefore.

The dehydrochlorination reaction at the second stage, which takes place between vinyldimethylchlorosilane and the silanol containing a (meth)acrylate group as one end group and a silanol group as the other, can be effected under the same conditions as the reaction at the second stage of the the foregoing process I. As for the mole ratio between the reactants in this reaction, dimethylchlorosilane should be used in an amount equimolar with, preferably in excess of, the silanol group of the polysiloxane.

This is because if the blockade of the silanol group with vinyldimethylchlorosilane is complete, the end product is contaminated with the organopolysiloxane both end groups of which are (meth)acrylate produced by bimolecular dehydration condensation of the silanol. This contamination can cause gelation during copolymerization with vinyl monomers; which copolymerization is the main application of the organopolysiloxane of this invention.

The reaction at the third stage, that is, the addition of an alkoxyhydrogensilane to the organopolysiloxane one end group of which is a (meth)acrylate group and the other end group of which is a vinyl group, is the same as the reaction at the third stage of the process I, so it can be effected under the same condition. In accordance with the process II, the compounds corresponding to k=1 in the general formula (i) are all that can be produced, because the starting (meth)acrylate-substituted dimethylsilanol has only one silanol group in a molecule.

According to the processes I' and II' described below, which are examples of modified ones of the processes I and II, an intermediate, that is, the polysiloxane one end group of which is blocked with a (meth)acrylate group and the other end group of which is blocked with vinyl group, can also be synthesized.

Process I'

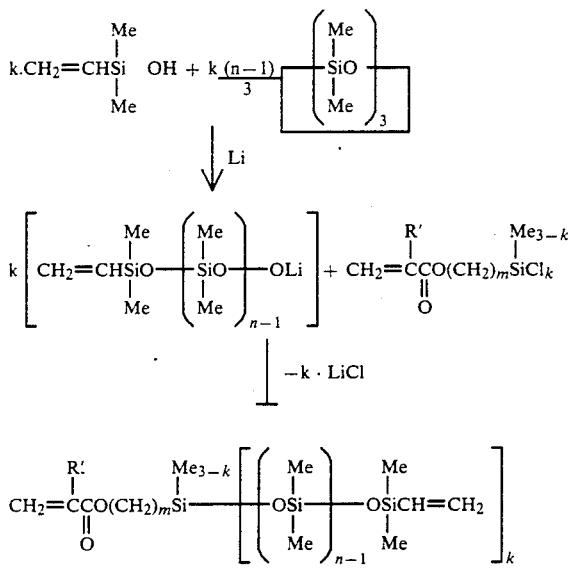

Process II'

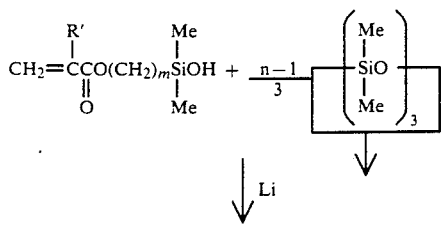

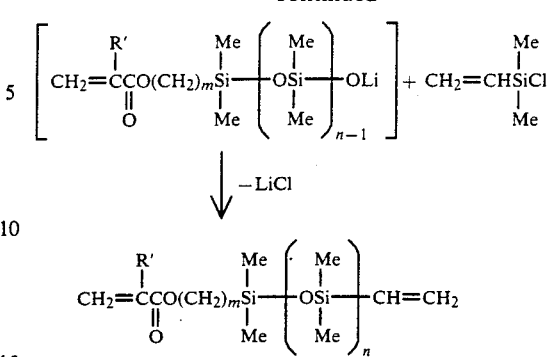

The anionic polymerization of hexamethyl-cyclo-trisiloxane using a silanol compound as a starting material in the processes I' and II' is effected by employing the catalysts and the conditions disclosed in U.S. Pat. No. 3,337,497, and the obtained living (reactive) polymer is subjected to capping with chlorosilane as is without an isolation step.

As an instance of catalysts preferred in the foregoing anionic polymerization, metallic lithium is cited. The catalysts as described in U.S. Pat. No. 3,337,497 or JP-Koukoku-47-44040, other than metallic lithium, which cannot sever the formed siloxane bond though they act only on the cleavage of cyclic siloxanes, with specific examples including alkyl, alkenyl and aryl compounds of lithium, are unfit for the catalysts of the above described anionic polymerization because they eliminate the methacryl or the vinyl group contained in the foregoing silanol compounds and introduce the arkyl, alkenyl or aryl group therein.

The reaction temperature ranges from −50° C. to 150° C., preferably from 0° C. to 70° C., and the reaction is completed in 5 minutes to 10 hours. It is to be desired in the foregoing reaction that a polar solvent, such as tetrahydrofuran, dimethylsulfoxide or so on, should be used.

The living polymer obtained by the polymerization is subjected to the lithium chloride elimination reaction with a chlorosilane as it is without being isolated, resulting in the production of the polysiloxane, one end group of which is blocked with a (meth)acrylate and the other end group of which is blocked with vinyl group. The lithium chloride elimination reaction therein takes place easily, and is completed in a very short time, even at ordinary temperature.

Structures of the organopolysiloxane of this invention, though can be easily presumed from the reactions in their production processes, can be determined from the characteristic peaks in NMR and IR spectra in addition to elemental analysis, as shown in the examples described hereinafter.

As examples of methods for synthesizing moisture cross-linkable polymers containing alkoxysilyl functional groups by the use of the organopolysiloxanes of this invention, mention may be made of the copolymerization with polymerizable monomers containing a vinylic unsaturated double bond, and the method of grafting on thermoplastic polymers.

In the former copolymerization, the organopolysiloxanes of this invention can be copolymerized with polymerizable monomers having 1–18 carbon atoms such as saturated alkyl(meth)acrylates, hydroxyethyl(meth)acrylate, hydroxypropyl-(meth)acrylate, glycidyl-(meth- )acrylate, or perfluoroalkyl-(meth)acrylates having 1–10 carbon atoms, styrene, aliphatic vinyl esters having 1–12 carbon atoms, (meth)acrylamide, (meth)acrylicacid, maleic anhydride, maleic acid, fumaric acid, butadiene, acrylonitrile, vinyl chloride, vinylidene chloride and so on.

As for the copolymerization method, all of known methods, such as block polymerization, solution polymerization, emulsion polymerization, suspension polymerization or so on, can be employed.

Examples of polymerization catalysts which can be used include radical generators such as benzoyl peroxide, dicumylperoxide, cumene hydroperoxide, di-t-butyl peroxide, diisopropyl-peroxycarbonate, acetyl peroxide, azobisisobutyronitrile, and so on.

The grafting can be achieved by heating and kneading a backbone(substrate) polymer and the organopolysiloxane of this invention in the presence of a polymerization catalyst as described above.

Examples of backbone(substrate) which can be employed therein include polyethylene, polypropylene, polymethylpentene-1, polyvinyl chloride, polyvinylidene chloride, and polyethylene copolymers prepared by using vinyl monomers such as vinyl acetate, (meth)acrylate, propylene, butene-1, pentene-1, hexene-1 or the like.

The polymers into which the organo-polysiloxanes of this invention have been introduced as cross-linking groups in the above-described manners have great moisture permeability as a whole since the introduced organopolysiloxanes contain a dimethyl-polysiloxane chain highly permeable to moisture as a basic skeleton.

In the thus obtained polymers, the distance between the substrate polymer and an alkoxysilyl group which functions as the cross-linking is lengthened to a great extent, and therefrom were gained many advantages that not only an efficiency but also a speed of cross-linking are heightened, compared with cases in which conventional alkoxysilanes are used and moreover, the cross-linkability at the depth is satisfactory and the cross-linked polymers acquire high flexibility due to extremely excellent stress relaxation characteristics inherent in the dimethyl-polysiloxane chain which results in a sharp increase in the crack resistance.

EXAMPLES

This invention will now be illustrated in more detail by reference to the following examples. However, the invention should not be construed as being limited to the following examples.

EXAMPLE 1

In a glass reactor equipped with a stirrer, a thermometer, a reflux condenser and a dropping funnel, were introduced 10.2 g of vinyldimethylsilanol, 148 g of hexamethyl-cyclotrisiloxane and 18 g of acetonitrile. The reactor was placed in an oil bath, and the ingredients were heated to 70° C. to be converted to a homogeneous solution. To this solution was added 0.06 g of a coordination silicon catalyst of the formula.

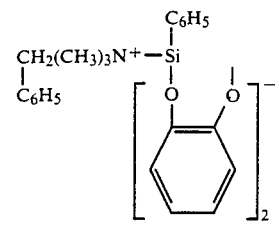

and the polymerization was accomplished by 3 hours' stirring at 70° C. At the conclusion of the polymerization, a piece of dry ice was introduced into the reaction mixture to inactivate the catalyst, and then 8.7 g of pyridine and 50 g of toluene were admixed therewith. To the resulting mixture, 22.1 g of 3-methacryloxypropyldimethylchlorosilane was added dropwise at 20° C. During the dropwise addition, the temperature of the reaction mixture rose to 38° C., and pyridine hydrochloride separated out. This solution was allowed to stand for 1 hour at 40° C., and then washed with one normal hydrochloric acid, followed by further washing with water for three times. The obtained toluene solution was dried over anhydrous sodium sulfate, and then the toluene was stripped under reduced pressure to yield 162 g of a colorless, transparent, slightly viscous liquid. This liquid had a viscosity of 21.1 centistokes (cs) at 25° C., specific gravity of 0.966 and refractive index of 1.4107, and was ascertained to be dimethylpolysiloxane containing methacryloxypropyl groups as one end group and a vinyl group as the other end group from IR spectrum, $^1$H NMR and GPC.

88.8 g portion of the obtained polysiloxane, 60 g of toluene and 0.025 g of 2% isopropyl alcohol (IPA) solution of chloro-platinic acid were introduced into a reactor, and the temperature of the mixture was maintained at 80° C. under stirring. Thereto, 6.7 g of trimethoxysilane was added in dropwise, and the mixture was allowed to stand for 5 hours while the temperature of the reaction system was kept at a temperature ranging from 80° C. to 90° C. After cooling to room temperature, the reaction mixture was treated with activated carbon, followed by stripping of toluene and excess trimethoxysilane under reduced pressure. Thus, 92 g of a colorless, transparent, slightly viscous liquid was obtained.

This liquid had a viscosity of 24.4 cs, specific gravity of 0.979 and refractive index of 1.4130, and was ascertained to be the compound having the average composition illustrated below from IR spectrum, $^1$H NMR and GPC.

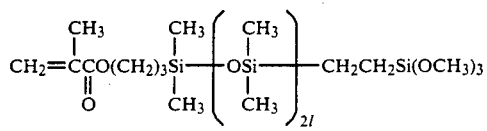

$^1$H-NMR Analysis
(internal standard: benzene δ7.25 ppm)

| δ: | 0.20 ppm | (Si—CH$_3$, | s, | 132 H) |
|---|---|---|---|---|
| | 1.66 ppm | (—CH$_2$—, | m, | 2 H) |
| | 3.58 ppm | (—O—CH$_3$, | s, | 9 H) |
| | 5.52 ppm | (—CH=C—, | m, | 1 H) |
| | 0.59 ppm | (Si—CH$_2$—, | m, | 6 H) |
| | 2.00 ppm | (≡C—CH$_3$ | s, | 3 H) |

|  |  |  |  |
|---|---|---|---|
| 4.02–4.33 ppm | (—C—O—CH$_2$—, ‖ O | t, | 2 H) |
| 6.11 ppm | (—CH=C—, | m, | 1 H) |

GPC Analysis
number average molecular weight on a polystyrene basis
(Mn): 1683
weight average molecular weight on a polystyrene basis
(Mw): 2037
variance Mn/Mw: 1.21

EXAMPLE 2

Similarly to Example 1, dimethylpolysiloxane one end group of which was blocked with methacryloxypropyl group and the other end group of which was blocked with vinyl group was prepared using 10.2 g of vinyldimethylsilanol, 66.6 g of hexamethylcyclotrisiloxane, 8 g of acetonitrile, 0.03 g of the silicon catalyst illustrated below,

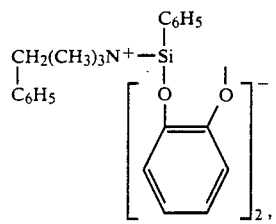

8.7 g of pyridine and 22.1 g of 3-methacryloxypropyldimethylchlorosilane. 90.4 g of the obtained polysiloxane, 13.4 g of trimethoxysilane and 0.05 g of 2% IPA solution of chloroplatinic acid were submitted to the reaction in the same manner as in Example 1 to yield 98.3 g of colorless, transparent, slightly viscous liquid. This liquid has a viscosity of 10.9 cs, specific gravity of 0.975 and refractive index of 1.4175, and was ascertained to be compound having the average composition illustrated below from IR spectrum, $^1$H-NMR and GPC.

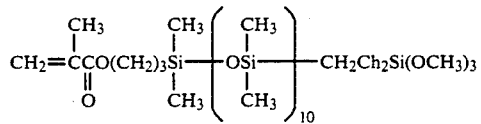

$^1$H-NMR Analysis
(internal standard: benzene δ7.25 ppm)

|  |  |  |  |  |
|---|---|---|---|---|
| δ: | 0.23 ppm | (Si—CH$_3$, | S, | 66 H) |
|  | 1.66 ppm | (—CH$_2$—, | m, | 2 H) |
|  | 3.56 ppm | (O—CH$_3$, | S, | 9 H) |
|  | 5.50 ppm | (CH=C, | m, | 1 H) |
|  | 0.53 ppm | (Si—CH$_2$—, | m, | 6 H) |
|  | 1.96 ppm | (≡C—CH$_3$, | S, | 3 H) |
|  | 3.94~4.23 ppm | (—C—O—CH$_2$—, ‖ O | t, | 2 H) |
|  | 6.06 ppm | (—CH=C—, | m, | 1 H) |

GPC Analysis
number average molecular weight on a polystyrene basis
(Mn): 956
weight average molecular weight on a polystyrene basis
(Mw): 1128
variance Mn/Mw: 1.18

EXAMPLE 3

In a glass reactor equipped with a stirrer, a thermometer, a reflux condenser and a dropping funnel, were introduced 10.2 g of vinyldimethylsilanol, 74.0 g of hexamethylcyclotrisiloxane and 9 g of acetonitrile were laid. The reactor was placed in an oil bath, and the ingredients were heated to 70° C. to be converted to a homogeneous solution. To this solution was added 0.03 g of a coordination silicon catalyst of the formula,

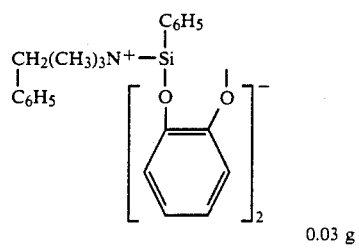

0.03 g and the polymerization was accomplished by 3 hours' stirring at 70° C. At the conclusion of the polymerization, a piece of dry ice was put into the reaction mixture to inactivate the catalyst, and then 8.7 g of pyridine and 50 g of toluene were admixed therewith. To the resulting mixture, 12.1 g of 3-methacryloxypropylmethyldichlorosilane was added dropwise at 20° C. During the dropwise addition, the temperature of the reaction mixture rose to 35° C., and pyridine hydrochloride was separated out. This solution was allowed to stand for 1 hour at 40° C., and then washed with one normal hydrochloric acid, followed by further washing with water for three times. The obtained toluene solution was dried over with anhydrous sodium sulfate, and then the toluene was stripped under reduced pressure to yield a colorless, transparent, slightly viscous liquid.

Figure 3:
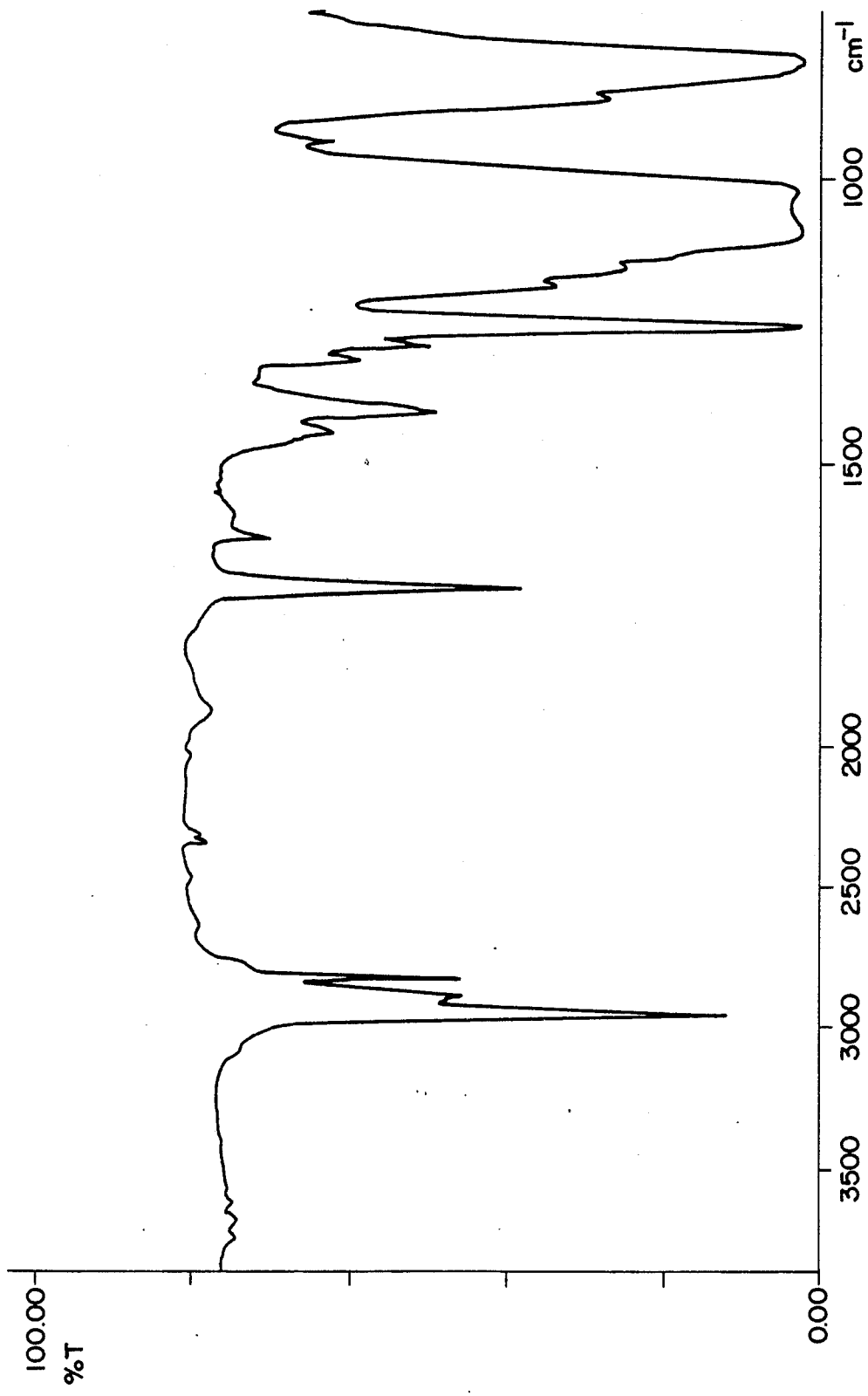
Figure 4:
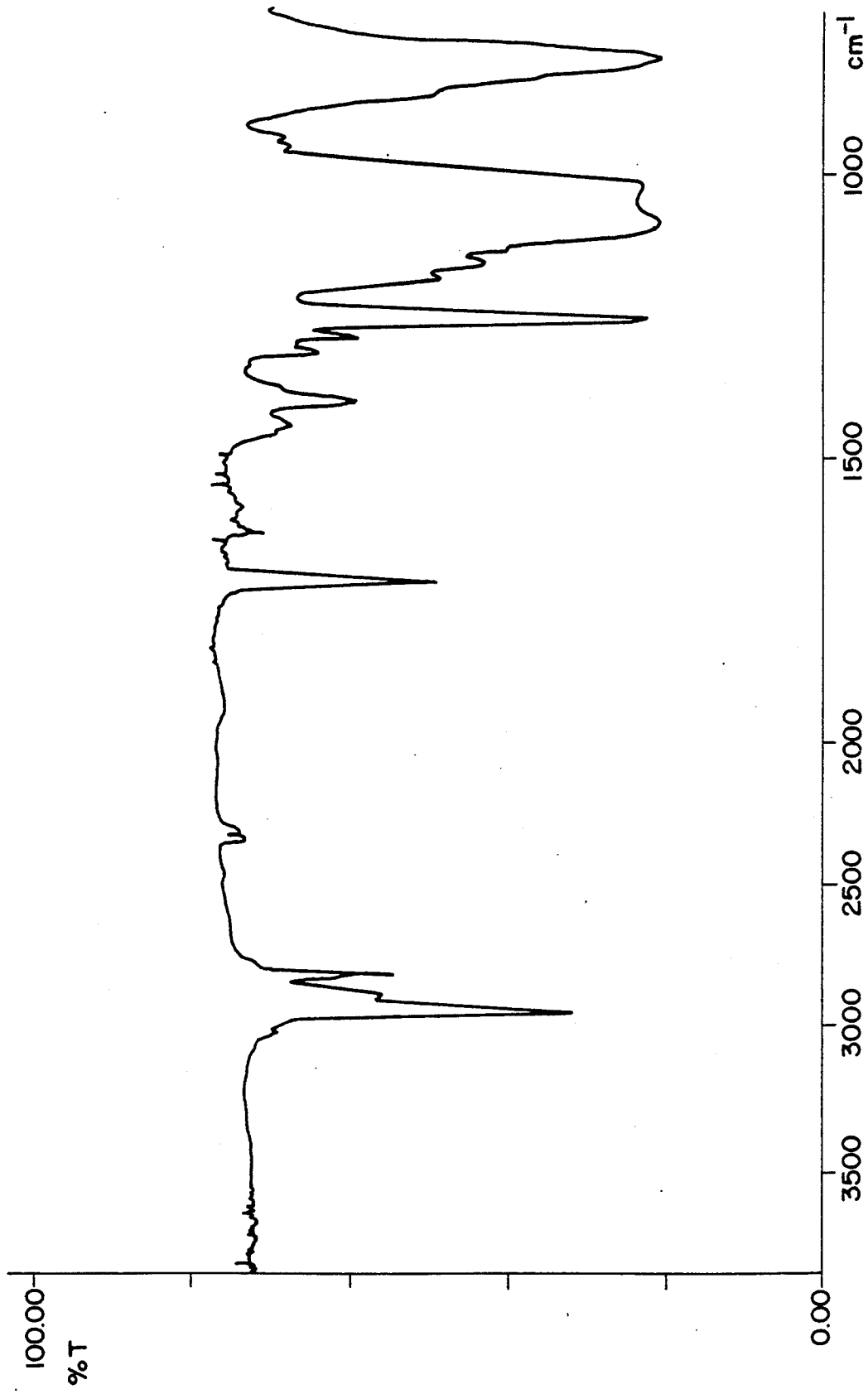
Figure 5:
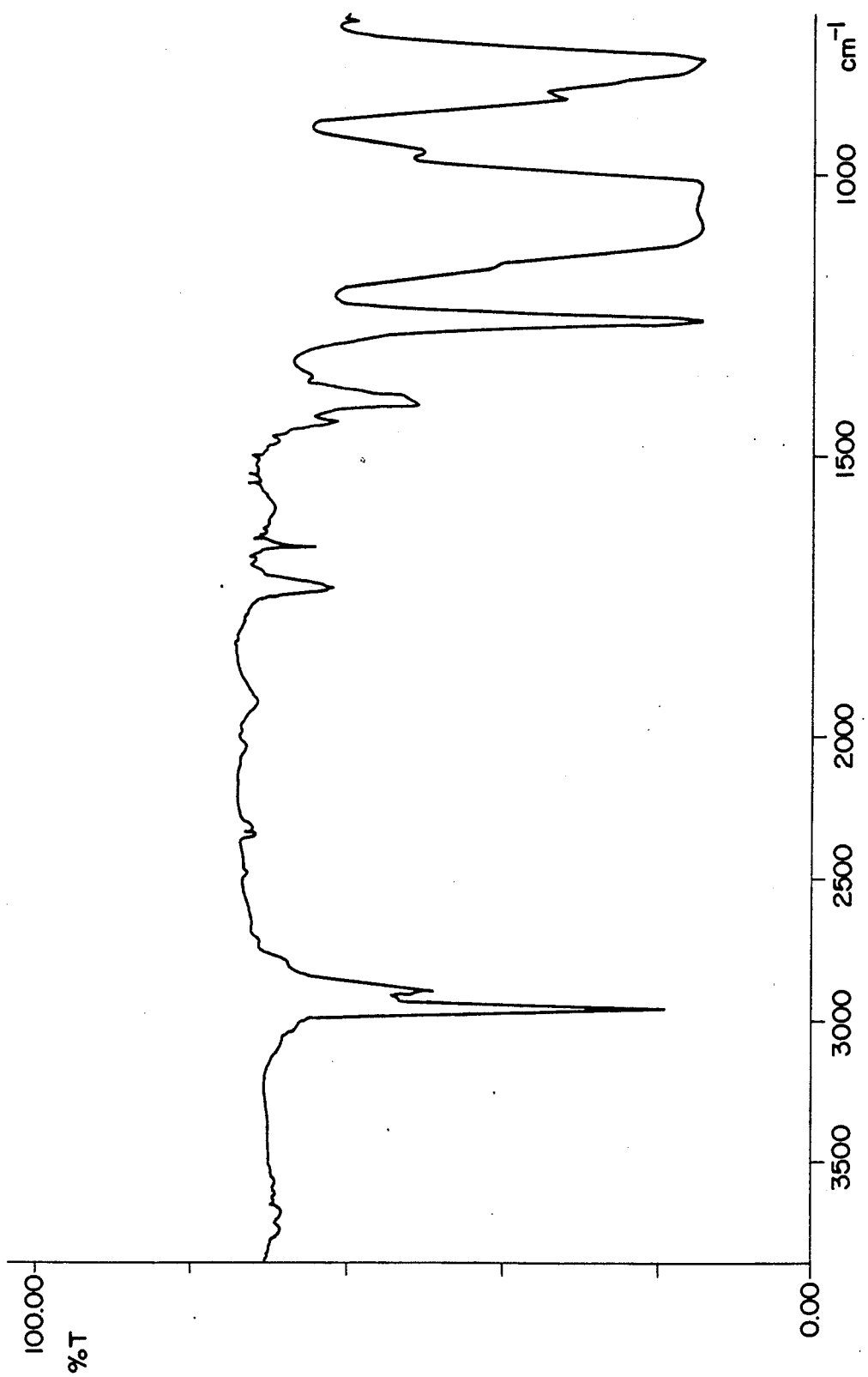

This liquid had viscosity of 26.9 cs at 25° C., specific gravity of 0.970 and refractive index of 1.425, and was ascertained to be the compound illustrated below from IR spectrum (See FIG. 3), $^1$H NMR and GPC.

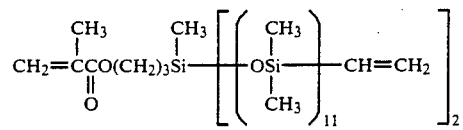

88.4 g portion of the obtained polysiloxane, 50 g of toluene and 0.05 g of 2% IPA solution of chloroplatinic acid were laid in a reactor, and the temperature of the mixture was kept at 80° C. under stirring. 13.4 g of trimethoxysilane was then added thereto dropwise, and allowed to stand for 5 hours as the temperature of the reaction system was kept at a temperature ranging from 80° C. to 90° C. After cooling to room temperature, the reaction mixture was treated with activated carbon, followed by stripping of toluene and excess trimethoxylsilane under reduced pressure. Thus, 99.6 g of colorless, transparent, slightly viscous liquid was obtained.

This liquid had a viscosity of 40.5 cs, specific gravity of 0.996 and refractive index of 1.4150, and was ascertained to be the compound having the average composition illustrated below from IR spectrum, ¹H-NMR and GPC.

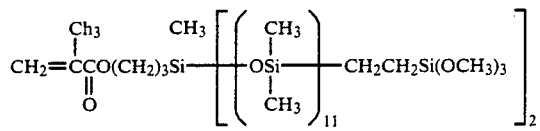

¹H-NMR Analysis
(internal standard: benzene δ7.25 ppm)

| δ: | 0.25 ppm | (Si—CH₃, | S, | 135 H) |
|---|---|---|---|---|
| | 1.66 ppm | (—CH₂—, | m, | 2 H) |
| | 3.58 ppm | (O—CH₃, | S, | 18 H) |
| | 5.51 ppm | (CH=C, | m, | 1 H) |
| | 0.58 ppm | (Si—CH₂—, | m, | 10 H) |
| | 1.99 ppm | (≡C—CH₃, | S, | 3 H) |
| | 3.96~4.28 ppm | (—C—O—CH₂—, ‖ O | t, | 2 H) |
| | 6.05 ppm | (CH=C, | m, | 1 H) |

GPC Analysis
number average molecular weight on a polystyrene basis
(Mn): 1744
weight average molecular weight on a polystyrene basis
(Mw): 2288
variance Mn/MW: 1.31

EXAMPLE 4

Similarly to Example 3, dimethylpolysiloxane which contained one methacryloxypropyl group in a molecule, and end group of which was blocked with vinyl group was prepared using 10.2 g of vinyldimethylsilanol, 44.4 g of hexamethylcyclotrisiloxane, 5 g of acetonitrile, 0.02 g of 5 co-ordination silicon catalyst illustrated below,

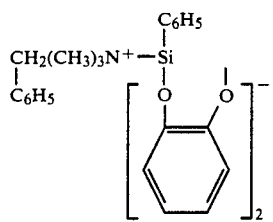

8.7 g of pyridine and 12.1 g of 3-methacryloxypropyl-methyldichlorosilane. 63.3 g portion of the obtained polysiloxane, 13.4 g of trimethoxysilane and 0.05 g of 2% IPA solution of chloroplatinic acid were submitted to the reaction in the same manner as in Example 3 to yield 73.6 g of colorless, transparent liquid. This liquid had viscosity of 16.5 cs, specific gravity of 0.992 and refractive index of 1.4183, and was ascertained to be the compound having the average composition illustrated below from IR spectrum, ¹H-NMR and GPC.

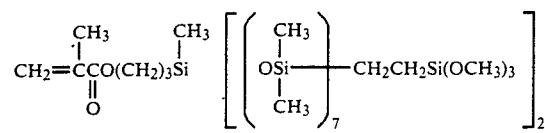

¹H-NMR Analysis
(internal standard: benzene δ7.25 ppm)

| δ: | 0.26 ppm | (Si—CH₃, | S, | 87 H) |
|---|---|---|---|---|
| | 1.61 ppm | (—CH₂—, | m, | 2 H) |
| | 3.57 ppm | (O—CH₃, | S, | 18 H) |
| | 5.50 ppm | (CH=C, | m, | 1 H) |
| | 0.56 ppm | (Si—CH₂—, | m, | 10 H) |
| | 1.95 ppm | (≡C—CH₃, | S, | 3 H) |
| | 3.93~4.23 ppm | (—C—O—CH₂—, ‖ O | t, | 2 H) |
| | 6.00 ppm | (CH=C, | m, | 1 H) |

GPC Analysis
number average molecular weight on a polystyrene basis
(Mn): 1330
weight average molecular weight on a polystyrene basis
(Mw): 1610
variance Mn/MW: 1.21

EXAMPLE 5

In a glass reactor equipped with a stirrer, a thermometer, reflux condenser and a dropping funnel, 16.0 g of 1-acryloxymethyl-dimethylsilanol, 222 g of hexamethyl-cyclotrisiloxane and 25 g of acetonitrile were laid. The reactor was put in an oil bath, and the ingredients were heated to 70° C. to be converted to a homogeneous solution. To this solution was added 0.09 g of 5 co-ordination silicon catalyst, and the polymerization was acomplished by 3 hours' stirring at 70° C. After the completion of the polymerization, a piece of dry ice was put into the reaction mixture to inactivate the catalyst, and then 8.7 g of pyridine and 100 g of toluene were admixed therewith. To the resulting mixture, 12.1 g of vinyldimethylchlorosilane was added dropwise at 20° C. During the dropwise addition, the temperature of the reaction mixture rose up to 33° C., and pyridine hydrochloride separated out. This solution was allowed to stand for 1 hour at 40° C., and then washed with one normal hydrochloric acid, followed by further washing with water three times. The obtained toluene solution was dried over with anhydrous sodium sulfate, and then the toluene was stripped under reduced pressure to yield a colorless, transparent, slightly viscous liquid.

236.5 g portion of the obtained polysiloxane, 120 g of toluene and 0.05 g of 2% IPA solution of chloroplatinic acid were laid in a reactor, and the temperature of the mixture was kept at 80° C. under stirring. 16.1 g of methyldiethoxysilane was added thereto dropwise, and allowed to stand for 5 hours as the temperature of the reaction system was kept at a temperature ranging from 80° C. to 90° C.

After cooling to room temperature, the reaction mixture was treated with active carbon, followed by stripping of toluene and excess methyldiethoxysilane under reduced pressure. Thus, 248 g of colorless, transparent, slightly viscous liquid was obtained. This liquid had a viscosity of 43.2 cs, specific gravity of 0.966 and refractive index of 1.4075, and was ascertained to be the compound having the average composition illustrated below from IR spectrum, $^1$H-NMR and GPC.

$$CH_2=CHCO-CH_2-\underset{\underset{CH_3}{|}}{\overset{\overset{CH_3}{|}}{Si}}-\left(\underset{\underset{CH_3}{|}}{\overset{\overset{CH_3}{|}}{OSi}}\right)_{31}-CH_2CH_2Si(OC_2H_5)_2$$

$^1$H-NMR Analysis
(internal standard: benzene δ7.25 ppm)

| δ: | | | | |
|---|---|---|---|---|
| 0.25 ppm | (Si—CH$_3$, | | S, | 192 H) |
| 1.10~1.47 ppm | (—CH$_3$—CH$_2$—O—, | | m, | 6 H) |
| 3.60~4.00 ppm | (—CH$_3$—CH$_2$—O—, | | m, | 4 H) |
| 0.55 ppm | (Si—CH$_2$—, | | m, | 4 H) |
| 3.43 ppm | (—C—O—CH$_2$—Si, ‖ O | | S, | 2 H) |
| 5.6~6.4 ppm | (CH$_2$=CH—, | | m, | 3 H) |

GPC Analysis
number average molecular weight on a polystyrene basis
(Mn): 2468
weight average molecular weight on a polystyrene basis
(Mw): 2962
variance Mn/MW: 1.20

APPLICATION EXAMPLE 1

In a glass reactor equipped with a stirrer, a thermometer, a reflux condenser and dropping funner, 453 g of toluene and 4 g of azobisisobutyronitrile were laid, and heated to 90° C. with stirring. Thereto, a mixture of 104 g of styrene, 142 g of n-butylmethacrylate, 100 g of methylmethacrylate, 107 g of the compound obtained in Example 2 and 8 g of azobisisobutyronitrile was added in dropwise as the temperature of the reaction system was regulated in the range of 85° C. to 90° C. After the dropwise addition, the stirring was further continued for 5 hours at 85°–90° C. to accomplish the polymerization.

As the result of GPC analysis, the molecular weight of the thus obtained copolymer was 12,300 on a polystyrene basis.

This copolymer underwent a film curing test in the following manner, and results shown in Table 1 were obtained.

CURING TEST 10 g of a toluene solution of the copolymer was admixed with 0.1 g of dibutyltin dilaurate and poured into a Teflon-coated mold 5 cm long, 5 cm broad and 1 cm deep, and placed in a thermo-hygrostat kept at 50° C.-60% RH in order to examine the curing speed. The curing speed was evaluated according to the following criterion.
A: not tacky to the touch.
B: tacky to the touch.

HEAT SHOCK TEST 10 g of a toluene solution of the copolymer was admixed with 0.1 g of dibutyltin laurate, coated on an aluminum pannel which had undergo a sand blast processing, and allowed to stand for 7 days in the atmosphere of 25° C.-50% RH to form a cured film. The thus prepared test panel was allowed to stand alternately for each 30 minutes in a 50° C. drying chamber and a −20° C. refrigerator for 5 times. Thereafter, the extent of crack generation in the film coat was observed.

Samples for comparison were prepared in a same manner described in the application Example 1, except the quantity of the toluene was changed to 371 g from 453 g and 24.8 g of 3-methacryloxypropyltrimethoxysilane was used in place of the copolymer obtained in Example 2.

TABLE 1

| Sample | Curing Test | | | | | | Crack |
|---|---|---|---|---|---|---|---|
| | 30 min. | | 60 min. | | 90 min. | | |
| | surface | inside | surface | inside | surface | inside | |
| I | A | A | A | A | A | A | not generated |
| II | B | B | A | B | A | B | generated |

*I Copolymer prepared using the compound obtained in Example 2.
*II Copolymer prepared using 3-methacryloxypropyltrimethoxysilane These results demonstrate that the polymer containing the organopolysiloxane of this invention as cross-linking groups was excellent in all respects, viz., cross-linking speed, depth cross-linkability, and crack resistance after cross-linking.

What is claimed is:

1. An organopolysiloxane represented by the formula:

$$CH_2=\underset{\underset{O}{\|}}{C}CO(CH)_{\overline{m}}\underset{\underset{}{|}}{\overset{\overset{R^1}{|}}{Si}}\underset{\underset{}{|}}{\overset{\overset{Me_{3-k}}{|}}{}}\left[\underset{\underset{Me}{|}}{\overset{\overset{Me}{|}}{(OSi)}}_{\overline{n}}CH_2CH_2\underset{\underset{}{|}}{\overset{\overset{Me_{3-l}}{|}}{Si}}(OR^2)_l\right]_k$$

wherein R$^1$ represents a methyl group or a hydrogen atom; R$^2$ represents a methyl or ethyl group; m represents an integer from 1 to 3; n represents an integer from 3 to 50; k represents the integer 1 or 2; and l represents the integer 2 or 3.

2. A method for producing an organopolysiloxane compound of claim 1, which comprises the steps of causing dimethyl-vinylsilanol and hexamethylcyclotrisiloxane to undergo a ring opening polymerization in a polar solvent in the presence of a 5 coordination silicon catalyst and at a temperature from 50° to 120° C. to obtain an organopolysiloxane, one end group of which is blocked by a vinyl group and the other of which is blocked by a silanol group, reacting the resulting organopolysiloxane with a chlorosilane compound substituted by a (meth)acryl group in the present of a hydrochloric acid capture agent and at a temperature from 0° C. to 120° C. to obtain an organopolysiloxane one end group of which is blocked by (meth)acrylic group and the other of which is blocked by vinyl group, and causing the thus blocked organopolysiloxane and an alkoxy-hydrogensilane to undergo a hydrosilylation reaction at a temperature from 50° C. to 150° C. in the present of a hydrosilylation catalyst.

3. The method of claim 2, wherein said polar solvent is at least one of acetonitrile, dimethylsulfoxide, dimethylsulfone and tetramethylenesulfone.

4. The method of claim 2, wherein the step of reacting the organopolysiloxane, one end group of which is blocked by vinyl group and the other one which is blocked by silanol group, with a (meth)acryl group-substituted chlorosilane compound is carried out under conditions that equimolar amounts of SiCl and SiOH are present in the reaction system.

5. A method of producing an organopolysiloxane compound of claim 1, which comprises causing hexamethylcyclotrisiloxane to react with (meth)acrylate-substituted dimethylsilanol in a polar solvent in the presence of a 5 coordination silicon catalyst and at a temperature from 50° C. to 120° C. to obtain an organopolysiloxane, one end group of which is blocked by a (meth)acrylate group and the other of which is blocked by a silanol group, reacting the thus obtained organopolysiloxane with vinyldimethylchlorosilane in the presence of a hydrochloric acid capture agent and at a temperature from 0° C. to 120° C. to obtain an organopolysiloxane, one end group of which is blocked by (meth)acrylic group and the other of which is blocked by vinyl group, and causing the thus blocked organopolysiloxane and an alkoxy-hydrogensilane to undergo an addition reaction at a temperature from 50° C. to 150° C.

6. The method of claim 5, wherein said polar solvent is at least one of acetonitrile, dimethylsulfoxide, dimethylsulfone and tetramethylenesulforan.

7. The method of producing the organopolysiloxane compound as claimed in claim 5, wherein the organopolysiloxane containing a (meth)acrylate group as one terminal group and a silanol group as the other terminal group is reacted with an amount of vinyldimethylchlorosilane in excess of that theoretically required to react with all of the silanol groups in the reaction system.

8. A moisture cross-linkable polymer containing an alkoxysilyl group, which is prepared by copolymerizing the organopolysiloxane of claim 1 and a polymerizable monomer containing a vinylic unsaturated double bond.

9. A moisture cross-linkable polymer containing an alkoxysilyl group, which is obtained by heating and kneading a mixture comprising an organopolysiloxane of claim 1 to a backbone polymer selected from polyethylene, polypropylene, polymethylpentene-1, polyvinyl chloride, polyvinylidene chloride and polyethylene copolymers, and a radical producing agent to thereby graft polymerize the organopolysiloxane onto the backbone polymer.

10. A moisture-cross-linkable polymer according to claim 8, wherein n of the organopolysiloxane is an integer from within the range of from 7 to 31.

11. A moisture-cross-linkable polymer according to claim 9, wherein n of the organopolysiloxane is an integer from within the range of from 7 to 31.

12. The method of claim 3, wherein the step of reacting the organopolysiloxane, one end group of which is blocked by vinyl group and the other of which is blocked by a silanol group, with a (meth)acryl group-substituted chlorosilane compound is carried out under conditions such that equimolar amounts of SiCl and SiOH are present in the reaction system.

13. The method of producing the organopolysiloxane compound as claimed in claim 6, wherein the step of reacting the organopolysiloxane, containing a (meth)acrylate group as one terminal group and silanol group as the other terminal group, is reacted with vinyldimethylchlorosilane in excess of the silanol groups in the reaction system.

* * * * *